US005093055A

United States Patent [19]

Skiff

[11] Patent Number: 5,093,055
[45] Date of Patent: Mar. 3, 1992

[54] PROCESS FOR SEALING A COVER OVER A VAULT

[76] Inventor: Eric A. Skiff, 2702 W. Cartmill, Tulare, Calif. 93274

[21] Appl. No.: 544,608

[22] Filed: Jun. 27, 1990

[51] Int. Cl.⁵ ............................................. B29C 67/22
[52] U.S. Cl. .................... 264/45.2; 264/46.6; 264/275; 264/278; 264/314
[58] Field of Search ............ 264/45.2, 46.5, 46.6, 264/275, 278, 314

[56] References Cited

U.S. PATENT DOCUMENTS

| | | | |
|---|---|---|---|
| 3,431,331 | 3/1969 | Pincus et al. | 264/46.6 |
| 3,962,394 | 6/1976 | Hall | 264/314 |
| 4,092,296 | 5/1978 | Skiff | 525/403 |
| 4,232,788 | 11/1980 | Roth | 264/45.2 |
| 4,269,890 | 5/1981 | Breitling et al. | 264/45.2 |
| 4,390,333 | 6/1983 | Dubois | 264/45.2 |
| 4,773,792 | 9/1988 | Landers | 405/230 |
| 4,821,399 | 4/1989 | Markley et al. | 264/46.6 |

Primary Examiner—Robert A. Dawson
Assistant Examiner—Allan R. Kuhns
Attorney, Agent, or Firm—Hawes & Fischer

[57] ABSTRACT

A process and resulting structure providing a utility vault with a foam-filled tube sealing the space between the vault walls and the vault cover. Preferably the tube includes an inner tube that is sufficiently porous to permit gas to flow therethrough but only a small amount of uncured foam to flow therethrough, and a plastic outer tube that prevents the foam from bonding to the vault structure.

11 Claims, 2 Drawing Sheets

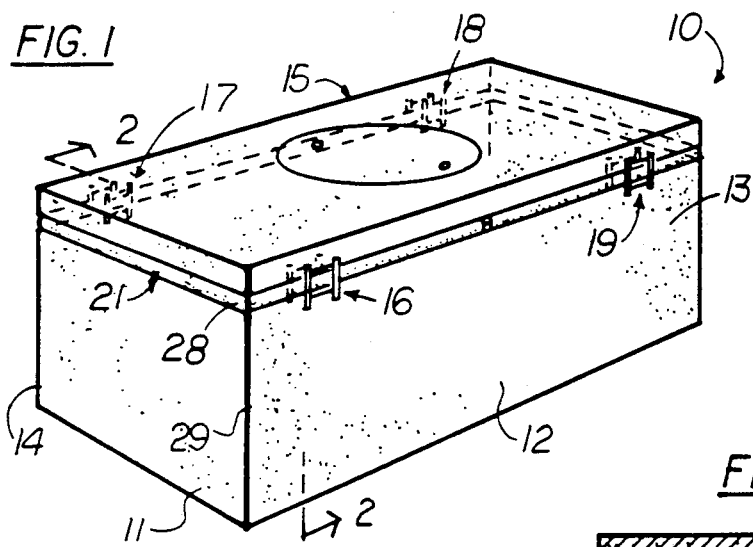
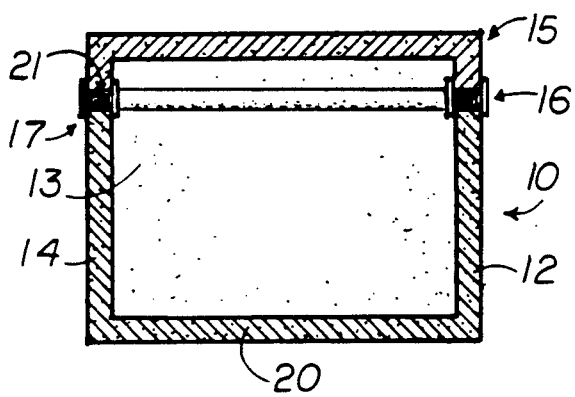
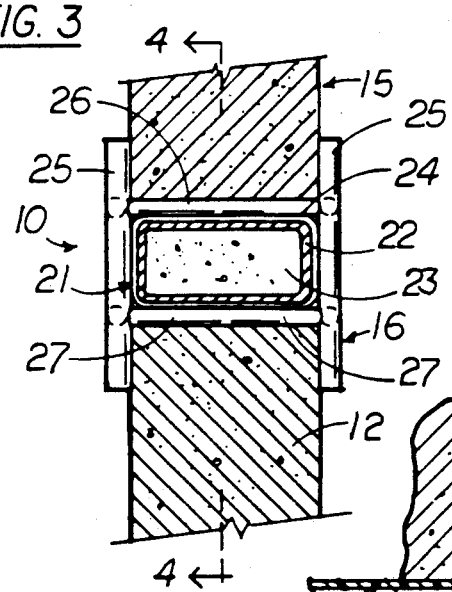
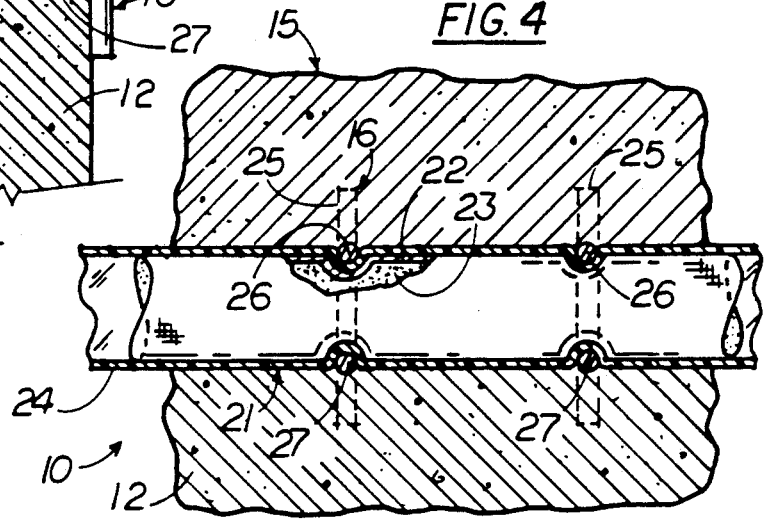

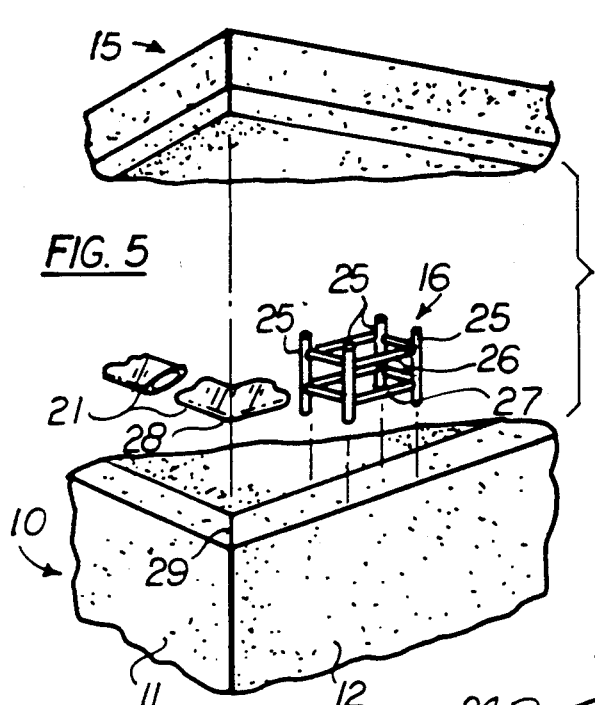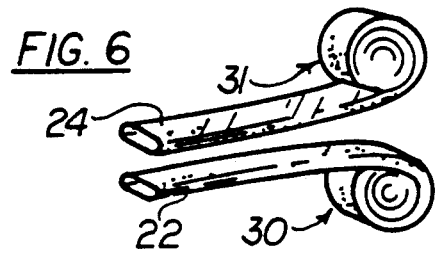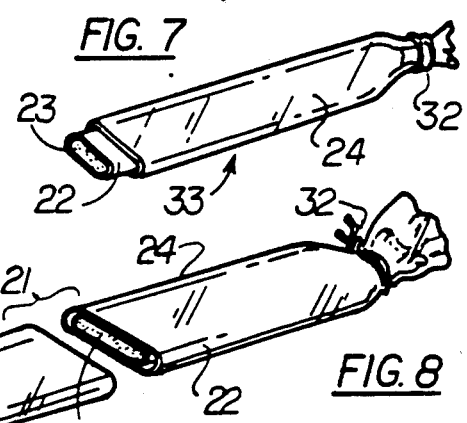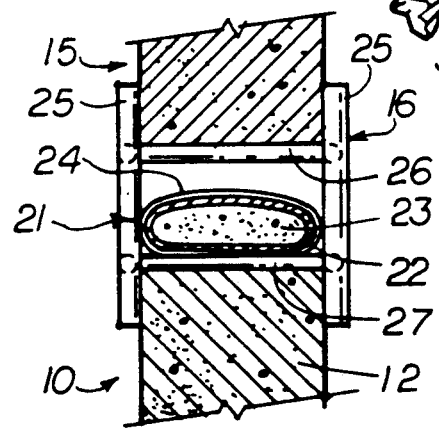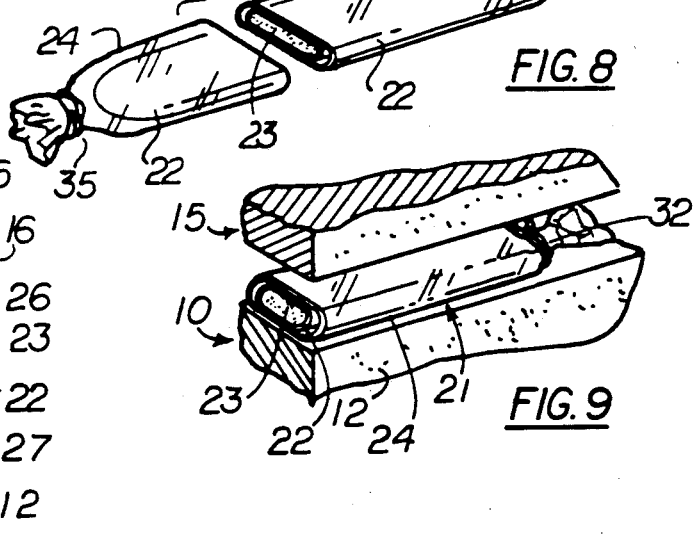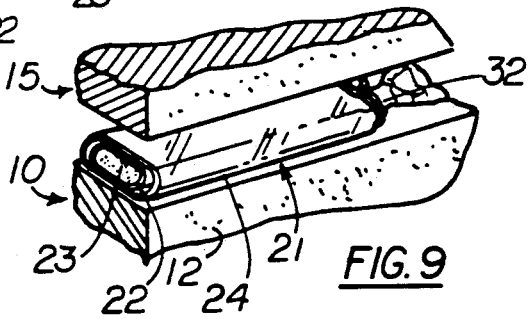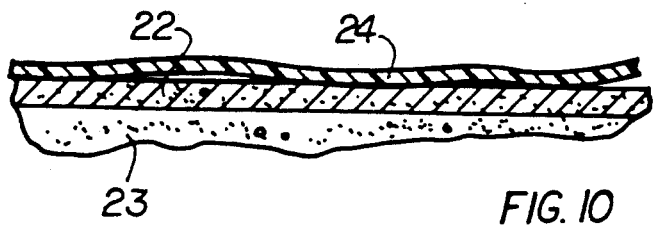

cartridge, the cover support member, plastic film covered porous tube and vault of FIG. 1;

PROCESS FOR SEALING A COVER OVER A VAULT

BACKGROUND OF THE INVENTION

1. Field of the Invention

The field of the invention is structural members, and the invention relates more particularly to underground vaults.

Typically, the cover of an underground vault is sealed over the vault by a cementitious grout. The major problem with the cementitious grout is that it is slow to cure. When the vault is located under a roadway, traffic must be diverted for about one day to provide sufficient time for the cement to completely cure.

One technique which does not use cementitious grout is shown in the Landers U.S. Pat. No. 4,773,792, which utilizes a plurality of porous bags placed along the upper surface of the vault wall. The bags contain an expandable epoxy resin of the type described in the Skiff U.S. Pat. No. 4,092,296 which is incorporated by reference herein. It has been found that because of the bond between the vault and vault lid, when removal of the vault lid occurs the vault itself suffers structural damage. This new process prevents that bond and saves the vault from damage.

SUMMARY OF THE INVENTION

It is an object of the present invention to provide a process for sealing a cover over a vault, which process provides a rapidly cured seal.

The present invention is for an improved process for sealing a cover over a vault of the type having a vault with a wall with an upper surface and a cover which mates with the upper surface of the vault. The process comprises the steps of forming at least one porous tube having a wall having a porosity sufficiently large to permit the flow of gas therethrough, but sufficiently fine to permit only a small amount of passage of uncured epoxy resin therethrough. The porous tube is covered with a sheet of plastic film, thus forming a plastic film covered porous tube. Next, the interior of the porous tube is filled with an epoxy resin prefoam of the type which expands prior to curing and which cures with an exothermic reaction and which prefoam further has a cure delay of at least three minutes at room temperature, due to a time delay between mixing of the epoxy resin and its exotherm, filled plastic film covered porous tube. Next, the prefoam filled film plastic covered porous tube is placed between the top of the vault and the bottom of the vault cover, and the epoxy resin prefoam is allowed to expand, thereby expanding the plastic film covered porous tube into intimate contact with the cover and the vault. Preferably, the plastic film is a polyethylene bag.

BRIEF DESCRIPTION OF THE DRAWINGS

With the foregoing offered by way of background and environment, a preferred embodiment of the invention herein is depicted in the several views of the drawing wherein:

FIG. 1 is a perspective view of a vault sealed with the process of the present invention;

FIG. 2 is a cross-sectional view taking along line 202 of FIG. 1;

FIG. 3 is an enlarged cross-sectional view showing the intersection of the cover and vault of FIG. 1;

FIG. 4 is a cross-sectional view taking along line 4—4 of FIG. 3;

FIG. 5 is an exploded perspective view showing the cover, cover support member, plastic film covered porous tube and vault of FIG. 1;

FIG. 6 is a perspective view of the plastic film covered porous tube useful with the process of the present invention;

FIG. 7 shows a length of plastic film covered porous tube tied at one end and partially filled with a epoxy resin prefoam;

FIG. 8 is a perspective view of the partially filled plastic film covered porous tube FIG. 7 tied at both ends;

FIG. 9 is a perspective view of the tied plastic film covered porous tube placed between the lid and the top of the vault;

FIG. 10 is an enlarged view of the wall of the porous tube and the plastic film of FIG. 6; and FIG. 11 is a cross-sectional view showing the epoxy resin beginning to expand with the final expanded view being shown in FIG. 3.

DESCRIPTION OF THE PREFERRED EMBODIMENT

A vault of the type used for holding electrical, or communication, or other utility connections, is shown in perspective view in FIG. 1 and indicated by reference character 10. Vault 10 has a base with four walls 11, 12, 13 and 14. A cover 15 is sealed to the top surface of the walls, and prior to expansion of the epoxy resin within the elongated tube, was held over the walls by four spacers 16, 17, 18 and 19.

The assembly of FIG. 1 is shown in cross-sectional view in FIG. 2 where it can be seen that cover 15 is sealed to the walls by an porous tube generally indicated by reference character 21. Bottom 20 is also shown in FIG. 2.

The details of the intersection between the cover 15 and wall 12 is shown in FIG. 3 where a porous tube 22 is filled with epoxy resin prefoam 23 and is covered with a plastic film 24. The details of spacer 16 are also shown where it can be seen that the space 16 has vertical legs 25, upper horizontal legs 26 and lower horizontal legs 27. It straddles the vault wall 12, as well as the downwardly depending portion of cover 15 to provide a secure support for the cover before the elongated tube 21 is placed therein.

The cross-sectional view taken along line 4—4 of FIG. 3 is shown in FIG. 4. There it is particularly clear that the plastic film 24 prevents any contact between the porous tube 22 and either the vault wall 12 or the cover 15.

Turning to FIG. 5, the elements of the assembly of FIG. 1 are shown in exploded perspective view. There it can be seen that the tube may be bent at corner 28 to accommodate corner 29 between walls 11 and 12. Thus, a single tube could actually be used to seal cover 15 to vault walls 11, 12, 13 and 14.

The details of the process are shown best in FIGS. 6 through 10. In FIG. 6, a roll of canvas tubing 30 is unrolled sufficiently to cut off a length of porous tubing. A similar length of plastic tubing is cut from roll 31 of plastic tubing. Plastic tubing 31 is preferably a six mils polyethylene tubing which provides excellent lubricity to prevent the foam from adhering to the concrete wall or cover. Next, the porous tube is inserted within a length of plastic film or tubing, and one end is tied with a tie 32, as shown in FIG. 7. The plastic film covered porous tube is indicated by reference character 33. It should be noted that while a plastic tube is shown in the drawings, it is possible that the porous tube could merely be wrapped with a plastic film. Tie 32 is preferably a conventional cable tie type tie. Next, the length of elongated tube tied at one end, as shown in FIG. 7, is partially filled with a plastic epoxy resin material of the type described in Skiff U.S. Pat. No. 4,092,296. The formulation shown in example 242 has been found to be particularly effective and its compressive strength may be dramatically increased by the addition of 0.75 parts per hundred of resin of powdered iron oxide. This resin prefoam material is mixed in a conventional manner with an inline mixture where the resin and hardener are passed through a mixing head and extruded through a nozzle into the interior of the porous tube 22.

After the porous tube 22 has been partially filled, the second end is tied, as shown in FIG. 8, with a second tie 35. The filled and tied length of elongated tube is then placed between the cover and the walls of the vault, as shown in FIG. 9. The epoxy resin prefoam has a substantial time delay between mixing and its exotherm, and it is during this time that the elongated tube is placed between the cover and the vault. Because of the plastic tubing, the assembly is particularly clean and easy to handle. If spacers, such as spacers 16 through 19, are used, the elongated tube is placed through the center of the spacing as shown best in FIG. 11.

After about eight minutes at 70° Fahrenheit, the formulation begins to cure and the foam begins to rise. As it rises, the elongated tube expands with the gas formed during the expansion step passing readily through the walls of porous tube 22 and into the interior of plastic film 24. It will be appreciated that the expanded foam enhances the overall structural strength and integrity of the vault and cover.

The fully expanded elongated tube usually causes the cover to rise above the spacers 16 through 19 so that a very tight contact is made between the expanded elongated tube and the cover and walls of the vault.

An enlarged view of the porous bag and the plastic film 24 is shown in FIG. 10, and the plastic film 24 is typically slightly larger than the expanded porous bag 22 so that it does not interfere with the full expansion of the porous bag 22.

While a single elongated tube may be used to seal the joint between the cover, it is often easier that a series of smaller elongated tubes be used, and this can easily be done since the porous tubes and plastic films or tubes can be cut on site. The material of construction of the porous tube is not critical, but it has been found that a heavy canvas tube having a 76 strand length by 28 strand with per inch weave was very satisfactory. As stated above, a polyethylene bag of six mils thickness proved very satisfactory.

The present embodiments of this invention are, thus, to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for sealing a cover over a vault of the type having a wall having an upper surface and having a cover which mates with the upper surface of the vault, said process comprising the steps of:

forming at least one elongated tube having a wall having a porosity sufficiently large to permit the flow of gas but sufficiently fine to permit only a small amount of passage of uncured epoxy resin through the walls thereof;

covering said at least one elongated tube with a sheet of plastic film to prevent foam from adhering to the wall or cover thus forming a plastic film covered elongated tube;

filling a portion of the interior of said elongated tube with an epoxy resin prefoam of the type which expands prior to curing and which cures with an exothermic reaction and which prefoam further has a cure delay of at least three minutes at room temperature to provide a prefoam filled, film covered elongated tube;

placing the prefoam filled, film covered elongated tube between the top of the vault and the bottom of the cover; and allowing the prefoam to expand and cure, thereby expanding said tube and film in intimate contact with the cover and the vault, and preventing bonding with said cover and said vault.

2. The process of claim 1, wherein a single elongated tube is used to cover the wall of the vault.

3. The process of claim 1, wherein said sheet of plastic film is polyethylene.

4. A process for sealing a cover over a vault of the type having a wall having an upper surface and having a cover which mates with the upper surface of the vault and wherein the cover is held over the wall of the vault by a plurality of spacers resting on said upper surface of said wall, said process comprising the steps of:

forming at least one elongated tube having a wall having a porosity sufficiently large to permit the flow of gas but sufficiently fine to permit only a small amount of passage of resin therethrough;

placing the elongated tube into an elongated plastic tube to prevent foam from adhering to the wall or cover to provide a plastic bag covered elongated tube;

filling a portion of the interior of said elongated tube with an epoxy resin prefoam of the type which expands prior to curing and which cures with an exothermic reaction and which prefoam further has a cure delay of at least eight minutes at room temperature;

placing said at least one plastic tube covered elongated tube between the top of the vault and the bottom of the cover to completely cover the upper surface of the wall of the vault; and allow the prefoam to expand and cure, thereby expanding said elongated tube and plastic tube in intimate contact with the cover and the vault, and preventing bonding with said cover and said vault.

5. The process of claim 4 wherein said spacers comprise a generally rectangular frame with a generally rectangular opening therethrough, said opening being aligned with the wall upon which it rests and wherein said elongated tube passes through the rectangular opening as a part of said placing of said porous tube.

6. The process of claim 5, wherein said rectangular frame has at least one pair of downwardly depending legs.

7. The process of claim 6, wherein said rectangular frame has two pairs of downwardly depending legs which straddle the upper portion of the wall on which the frame rests.

8. The process of claim 7, wherein said frame has two pairs of vertical bars, two pairs of horizontal bars extending at a right angle with respect to the wall upon which it rests and two pairs of horizontal bars extending parallel to the wall upon which the frame rests, said bars being joined to form a stable rectangular frame.

9. The process of claim 4, wherein said plastic tube is a polyethylene bag.

10. The process of claim 9, wherein said polyethylene bag has a wall thickness of about six mils.

11. A process for sealing a cover over a vault of the type having a vault with a wall having an upper surface and having a cover which mates with the upper surface of the vault, said process comprising the steps of:

forming at least one elongated tube having a wall having a porosity sufficiently large to permit the flow of gas therethrough but sufficiently fine to prevent the passage of any uncured epoxy resin therethrough;

filling a portion of the interior of said elongated tube with an epoxy resin prefoam of the type which expands prior to curing and which cures with an exothermic reaction that generates gas, and which prefoam further has a cure delay of at least three minutes at room temperature, to provide a prefoam filled covered elongated tube;

placing the prefoam filled elongated tube between the top of the vault and the bottom of the cover; and allowing the prefoam to expand and cure, thereby expanding said elongated tube into intimate contact with the cover and the vault, and preventing bonding with said cover and said vault.

* * * * *